April 8, 1958   W. D. HOFER   2,829,485
ROTARY PICK UP FOR GRAIN COMBINES
Filed Aug. 2, 1956

INVENTOR.
Walter David Hofer
BY
*L. S. Saulsbury*
ATTORNEY

# United States Patent Office 2,829,485
Patented Apr. 8, 1958

2,829,485
ROTARY PICK UP FOR GRAIN COMBINES

Walter David Hofer, Brocket, Alberta, Canada

Application August 2, 1956, Serial No. 601,686

3 Claims. (Cl. 56—364)

This invention relates to a rotary spiral pick up for grain combines.

It is the principal object of the present invention to provide a pick up for grain combines, in which when the grain pick up fingers are moving toward the ground they will be caused to be moved diagonally laterally so as to pick up such grain stalks that lay on the ground running in the direction of movement of the pick up and which would ordinarily be wasted unless some means were provided to move the fingers laterally for engagement with these stalks.

It is another object of the invention to provide a pick up device having spring fingers moving laterally wherein the movement of these fingers is effected through engagement of the ends of the finger mounting bars with appropriate cam surfaces by which the lateral movement of the fingers is confined within the slots between guiding plates without frictional engagement of the fingers with the side edges of the plates but made with precision to follow the center of the slots between the plates.

Other objects of the invention are to provide a pick up device for combines having the above objects in mind, which is of simple construction, inexpensive to manufacture, has a minimum number of parts, compact, efficient and effective in use.

For a better understanding of the invention, reference may be had to the following detailed description taken in connection with the accompanying drawing, in which—

Figure 2:
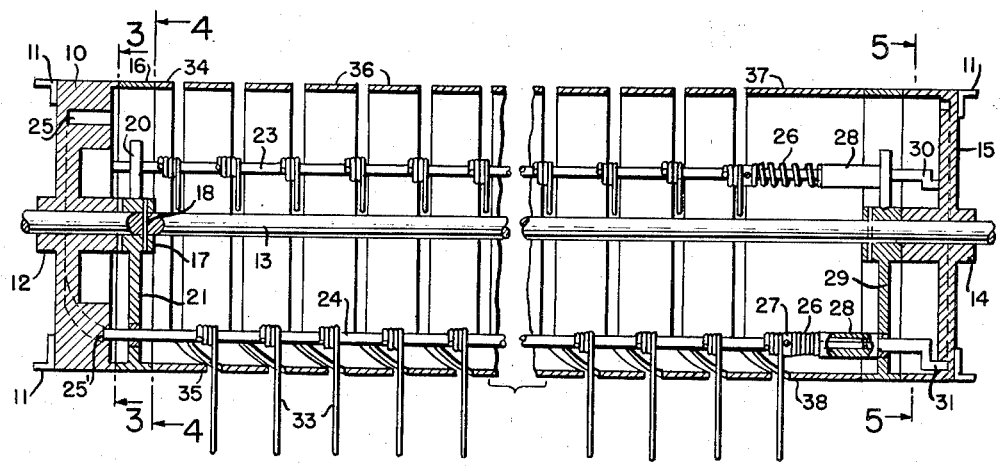
Figure 1:
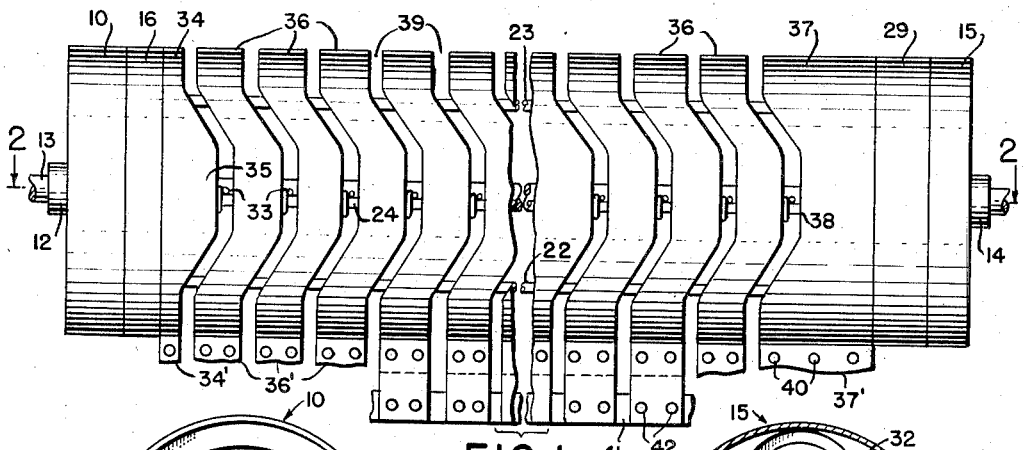
Figure 3:
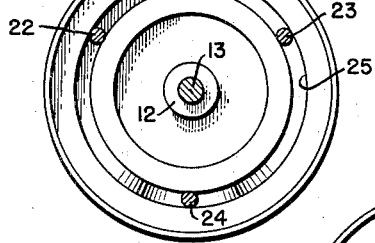
Figure 4:
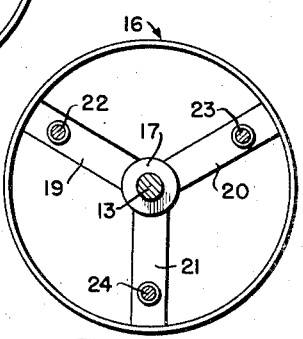
Figure 5:
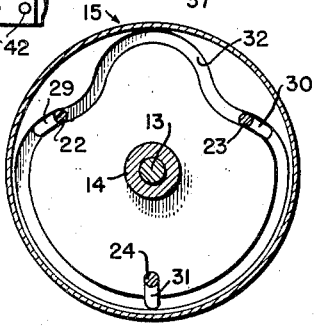

Figure 1 is a bottom plan view of the pick up device embodying the features of the present invention and showing the offset slots and the fingers operable therein for the transverse movement while they are in engagement with the ground so that they will cause the longitudinally-extending straws to be picked up, Fig. 2 is a vertical sectional view taken on line 2—2 of Fig. 1 and showing the internal mechanism thereof, Fig. 3 is a transverse sectional view of the pick up device looking upon the cam which causes the lateral movement of the mounting bars and fingers while making the bottom sweep, this view being taken on line 3—3 of Fig. 2, Fig. 4 is a transverse sectional view looking upon the wheel in which the ends of the mounting finger bars are carried angularly displaced from one another, this view being taken upon line 4—4 of Fig. 2, and Fig. 5 is a transverse sectional view looking upon the cam for turning the mounting bars to release the straws from the fingers and as viewed on line 5—5 of Fig. 2.

Referring now to the figures, 10 represents an end plate member which is secured to a frame 11 of the combine and held against rotation thereon. This end member has a central hub bearing 12 in which is journalled a drive shaft 13. The opposite end of this drive shaft is journalled in a hub portion 14 of another end plate 15 which is also supported on the frame 11 at the opposite side of the pick up.

A spider member 16 has a hub 17 that is fixed by a pin 18 to the shaft 13 to be driven thereby. This spider member has spokes 19, 20 and 21, Fig. 4, in which the ends of spring finger mounting bars 22, 23 and 24 are respectively mounted and which project to the left thereof to have their ends run in a cam groove 25 in end plate 10 as the shaft 13, spider 16 and the mounting bars are turned.

These mounting bars are normally held in the cam groove by compression springs 26 disposed on the opposite ends thereof and which respectively react against set collars 27 on the bars and sleeves 28 splined to the mounting bars so that through these sleeves rotation can be imparted to the mounting bars about their own axes as crank end members 29, 30 and 31 joined to the bars by the sleeves respectively, operate in a cam groove 32 in the end plate 15 to turn the mounting bars as they are rotated by the turning of the shaft 13, the spider 16 and the spider 29 also fixed to the shaft 13. The cam groove 32 is so shaped as to cause the turning of the mounting bars so as to project spring fingers 33 as the mounting bars carrying these fingers move toward the bottom of the pick up devices.

The pick up device has a plurality of guard members. A guard 34 is located adjacent to the spider 16 and has an offset portion 35 on the bottom thereof. Similar shaped guard members 36 extend throughout the length of the pick up device to a guard plate member 37 that is recessed on the bottom as indicated at 38 to cooperate with guard members 36. These guards are separated from one another to provide similar slots 39 offset on their bottoms to permit the spring fingers 33 to be laterally shifted as they are drawn over the ground.

The guard members 34, 36 and 37 are circular and have separable ends connected together by rivets 40 to provide attaching projections 34', 36' and 37' that are secured to transverse frame member 41 forming a part of the frame 11 of the combine by rivets 42 and serve to rigidly support the guard members without interfering with the operation of the pick up fingers that move in and out of the slots 39.

The fingers 33 are fixed to each mounting bar so as to provide a coil portion around the same and allow the fingers to yield to the ground surface. While moving over the ground surface the mounting bars 23 are laterally shifted against the reaction of compression springs 26 so they conform to the cam groove 25. This cam groove has a raised surface 25' under which the ends of the bars ride against the action of the springs 26 to be moved laterally to the right. At the same time the fingers are moved in a path conforming to the shape of the slots 39 on the underface of the pick up and any grain straws running longitudinal with the movement of the pick up will be laterally turned so as to be picked up by the pick up fingers. As the fingers continue to move upwardly the mounting bars and the fingers are moved to the left and at the same time the crank end members of the mounting bars are turned in the upper part of the groove 32 so as to retract the fingers and free the grain stalks so that they may be freed of the grain straws.

While various changes may be made in the detailed construction, it shall be understood that such changes shall be within the spirit and scope of the present invention as defined by the appended claims.

What is claimed is:

1. A grain pick up device comprising end plate members and guard members disposed therebetween and spaced from one another to provide slots, said slots having offset sections at the bottoms thereof, mounting bars having spring fingers that are adapted to be extended through the slots, spider means carrying the mounted bars and journalled in the end plate members for rotating said mounting bars within the end and guard members in reel-like manner and means associated with the respective mounted bars for urging the mounting bars and their spring fingers laterally as the spring fingers pass through the offset slot section of the slots and means acting upon said mounting bars to turn the bars to extend the fingers through the guard members at the bottom of the device and to retract them as they reach the top of the device to release the straws therefrom.

2. A grain pick up device as defined in claim 1, and said means for urging the mounting bars laterally at the bottoms of the slots comprising a cam surface provided on one of the end plates and adapted to be engaged by the ends of the mounting bars and spring members reacting against the mounting bars to cause them to follow the cam surface.

3. A grain pick up device as defined in claim 2, and said spider means for rotating said finger mounting bars comprising a shaft journalled in the end plates, spider members fixed to said shaft adjacent to the end plates, said mounting bars being journalled in and adapted to have sliding endwise movement through the spider member adjacent to the cam surface, said other end plate having a cam groove therein, crank members journalled on a spider member engaging with the cam groove, splined sleeves connecting the crank members with the mounting bars to provide an extension thereon, said spring members surrounding said mounting bars and reacting between sleeves and said bars.

References Cited in the file of this patent

UNITED STATES PATENTS

| | | |
|---|---|---|
| 1,877,519 | MacGregor | Sept. 13, 1932 |
| 2,157,261 | Innes | May 9, 1939 |
| 2,497,409 | Jones | Feb. 14, 1950 |

FOREIGN PATENTS

| | | |
|---|---|---|
| 189,716 | Germany | Apr. 3, 1907 |